US010800602B2

(12) United States Patent
Blinn et al.

(10) Patent No.: US 10,800,602 B2
(45) Date of Patent: Oct. 13, 2020

(54) FLOATING ROOF FOR STORAGE TANKS

(71) Applicant: T.F. Warren Group Corporation, The Woodlands, TX (US)

(72) Inventors: Christopher Andrew Blinn, Anderson, TX (US); Mark Mickan, Hockley, TX (US)

(73) Assignee: TF Warren Group Corporation, Spring, TX (US)

( * ) Notice: Subject to any disclaimer, the term of this patent is extended or adjusted under 35 U.S.C. 154(b) by 0 days.

(21) Appl. No.: 16/252,333

(22) Filed: Jan. 18, 2019

(65) Prior Publication Data

US 2019/0152692 A1    May 23, 2019

Related U.S. Application Data

(63) Continuation of application No. 14/858,596, filed on Sep. 18, 2015, now Pat. No. 10,183,803.

(60) Provisional application No. 62/159,769, filed on May 11, 2015.

(51) Int. Cl.
| | | |
|---|---|---|
| *B65D 88/34* | (2006.01) | |
| *B23K 31/02* | (2006.01) | |
| *B23K 101/04* | (2006.01) | |
| *B23K 101/24* | (2006.01) | |
| *B23K 103/04* | (2006.01) | |
| *B23K 103/10* | (2006.01) | |
| *B23K 103/16* | (2006.01) | |

(52) U.S. Cl.
CPC ............. *B65D 88/34* (2013.01); *B23K 31/02* (2013.01); *B23K 2101/045* (2018.08); *B23K 2101/24* (2018.08); *B23K 2103/04* (2018.08); *B23K 2103/05* (2018.08); *B23K 2103/10* (2018.08); *B23K 2103/16* (2018.08)

(58) Field of Classification Search
CPC .. B63B 1/00; B63B 1/12; B63B 1/121; B63B 1/18; B63B 3/00; B63B 3/04; B63B 5/00; B63B 5/24; B65D 88/00; B65D 88/34; B23K 31/00; B23K 31/02
USPC ............... 114/292, 61.2, 61.27, 61.29, 61.32
See application file for complete search history.

(56) References Cited

U.S. PATENT DOCUMENTS

| | | | | |
|---|---|---|---|---|
| 1,748,231 | A | | 2/1930 | Kimbell |
| 3,547,062 | A | * | 12/1970 | Rainu ..................... B64C 35/00 |
| | | | | 114/292 |
| 4,777,898 | A | * | 10/1988 | Faulkner ................... B63B 5/24 |
| | | | | 114/292 |

(Continued)

FOREIGN PATENT DOCUMENTS

WO    2012049502 A2    4/2012

OTHER PUBLICATIONS

Canadian Office Action for Application No. 2,929,339 dated Oct. 23, 2017.

*Primary Examiner* — Lars A Olson
(74) *Attorney, Agent, or Firm* — C. Tumey Law Group PLLC

(57) ABSTRACT

Embodiments relate generally to a floating roof for use in storage tanks. A floating roof may comprise a plurality of pontoons arranged to form the floating roof. The pontoons may each comprise a lower panel, a plurality of outer walls disposed at the edges of the lower panel, and a plurality of stiffeners disposed adjacent the lower panel. Attachment points attached to the floating roof, wherein the attachment points are configured to couple the floating roof to a storage tank.

3 Claims, 8 Drawing Sheets

(56) References Cited

U.S. PATENT DOCUMENTS

| | | | |
|---|---|---|---|
| 4,993,350 A * | 2/1991 | Pepper | B63B 1/121 |
| | | | 114/292 |
| 5,704,509 A | 1/1998 | Rosenkrantz | |
| 5,988,087 A * | 11/1999 | Pepper | B63B 1/12 |
| | | | 114/61.2 |
| 6,516,736 B1 * | 2/2003 | Van Lancker | B63B 5/24 |
| | | | 114/292 |
| 7,240,804 B2 | 7/2007 | King et al. | |
| 7,870,830 B2 * | 1/2011 | Bogard | B63B 1/20 |
| | | | 114/292 |
| 2007/0272692 A1 | 11/2007 | Hiner | |
| 2009/0223957 A1 | 9/2009 | Doxey et al. | |
| 2012/0193363 A1 | 8/2012 | Baillie | |
| 2013/0284740 A1 | 10/2013 | Doxey et al. | |
| 2013/0327773 A1 | 12/2013 | Rosenkrantz | |
| 2014/0231431 A1 | 8/2014 | Rosenkrantz | |

* cited by examiner

FLOATING ROOF FOR STORAGE TANKS

CROSS-REFERENCE TO RELATED APPLICATIONS

The present application is a continuation of U.S. Non-Provisional application Ser. No. 14/858,596, filed Sep. 18, 2015, which claims priority to U.S. Provisional Application No. 62/159,769, filed May 11, 2015, the entire disclosures of which are incorporated herein by reference.

BACKGROUND

Embodiments relate generally to a floating roof for use in storage tanks. More particularly, embodiments relate to a system and a method of producing a floating roof.

Currently, floating roof designs may be time consuming to build and may require large amounts of onsite welding. This may lead to large labor cost and quality control issues. Additionally, floating roofs may be welded together and connect to a single rim. The single rim may be welded to many different pontoons that make up the floating roof. This may add additional labor time and cost to floating roof construction. In an effort to reduce material, cost, labor, and construction time, a pontoon is needed that may be easy to construct, cheap to produce, and quickly installed.

BRIEF DESCRIPTION OF THE DRAWINGS

These drawings illustrate certain aspects of some of the embodiments of the present invention and should not be used to limit or define the invention.

DETAILED DESCRIPTION

Embodiments relate generally to a floating roof for use in storage tanks. More particularly, embodiments relate to pontoons that may be used with other pontoons to form a floating roof, which may prevent the evaporation of chemical fluids. In embodiments, a pontoon may comprise a lower panel, an outer wall, a stiffener, an upper panel, and a panel clip. The pontoon may attach to other pontoons, forming a floating roof, which may be placed upon a chemical fluid. Pontoons may connect to other pontoons through panel clips and/or directly welding pontoons to adjacent pontoons. In embodiments, outermost pontoons, adjacent a storage tank, wall may further attach to a rim. The rim may act as a buffer between the outermost pontoons and storage tank wall, allowing the floating roof to move as chemicals are added or removed from the storage tank. Advantageously, the pontoons disclosed herein may reduce the material, cost, labor, and construction time associated with production of a floating roof.

Figure 1:
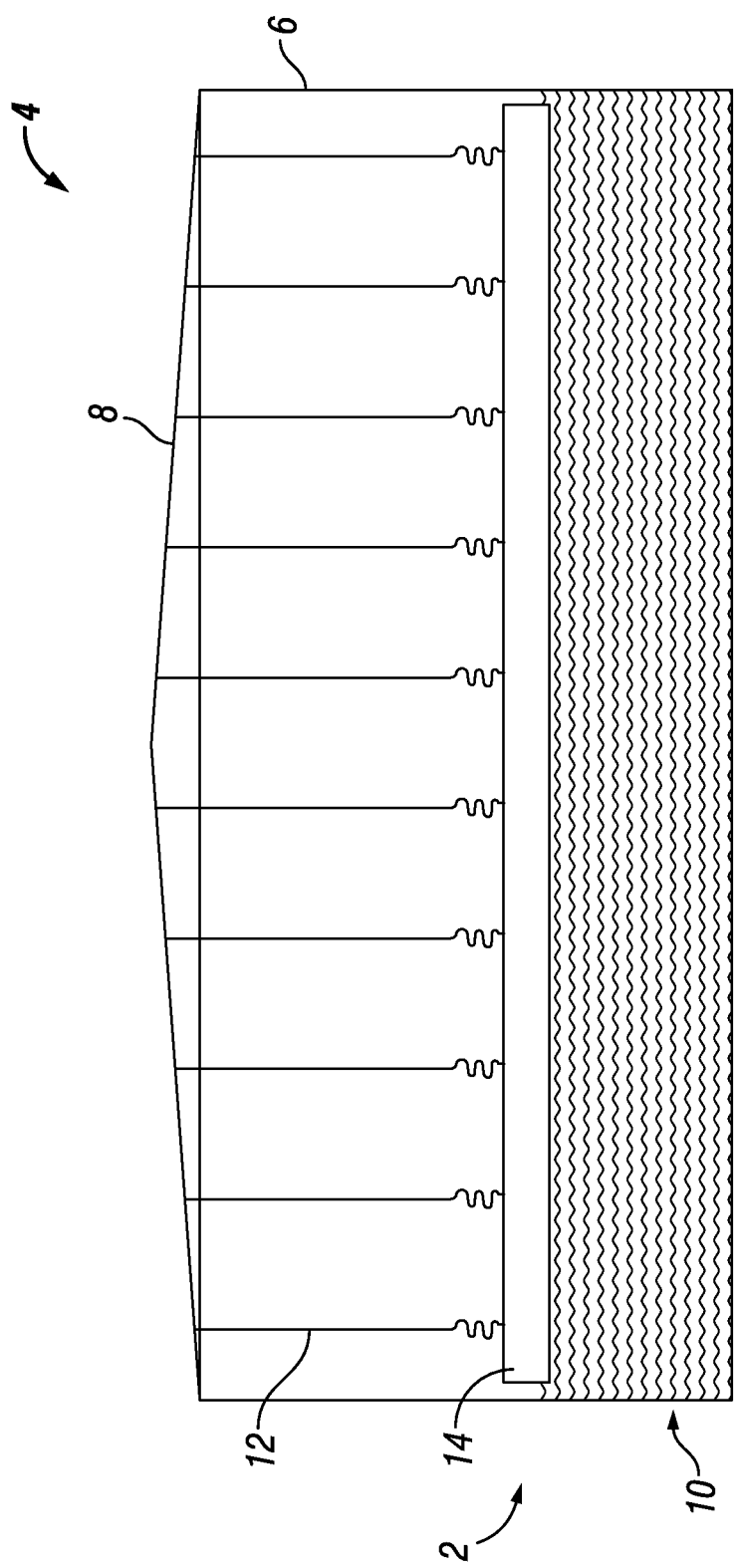
FIG. 1 illustrates a side perspective view of a floating roof system.

FIG. 1 illustrates an embodiment of floating roof system 2. Floating roof system 2 may be housed within a storage tank 4. Storage tank 4 may comprise a storage tank wall 6 and a storage tank roof 8. Storage tank 4 and storage tank roof 8 may comprise any suitable material for storing a chemical fluid 10. Suitable materials may be, but are not limited to, stainless steel, aluminum, steel, black iron, and/or any combination thereof. Chemical fluids 10 that may be stored within storage tank 4 may comprise petroleum products, crude oil, liquid chemical compounds, and/or any combination thereof. Storing chemical fluids 10 within a confined storage tank 4 may create an explosive environment. For example, chemical fluid 10 may vaporize and remain trapped within storage tank 4 and storage tank roof 8. This may lead to the possibility of explosion and/or loss of chemical fluid 10. To prevent the loss of chemical fluid 10 and an explosive environment, a floating roof system 2 may be placed within storage tank 4. Floating roof system 2 may comprise a floating roof 14 and a support 12. To prevent evaporation of chemical fluid 10, floating roof 14 may be disposed upon, and/or float, upon chemical fluid 10. Contact between floating roof 14 and chemical fluid 10 may prevent chemical fluid 10 from vaporizing.

In embodiments, floating roof 14 may not be sufficiently buoyant to float upon chemical fluid 10. To prevent floating roof 14 from sinking, floating roof 14 may be supported by support 12 and/or a plurality of supports 12 from storage tank roof 8. In embodiments, supports 12 may attach to tank roof 8 by any suitable means. Suitable means may be, but are not limited to nuts and bolts, pulleys, welding, and/or any combination thereof. Additionally, supports 12 may be disposed within storage tank roof 8 at any suitable location as to support floating roof 14. A suitable location may be about the center of storage tank roof 8, about the edges of storage tank roof 8, or between the center and edges of storage tank roof 8. Supports 12 may be any suitable chain, wire rope, or other suitable device which may be able to support the weight of floating roof 14. Supports 12 may attach to floating roof 14 through attachment points 30, described below. Additionally, bottom supports, not illustrated, may be positioned below floating roof 14 for support. These bottom supports may be beams, cylindrical legs, and/or columns within storage tank 4. In embodiments, bottom supports may attach to floating roof 14 by any suitable means. Suitable means may be, but are not limited to, welding, nuts and bolts, adhesive, and/or any combination thereof. Bottom supports may be disposed at any suitable location along floating roof 14. A suitable location may be about center, about the edges of the floating roof, and/or between center and the edge of floating roof 14. Both supports 12 and/or bottom supports may be used to support floating roof 14 in the absence of chemical fluid 10.

Figure 2:
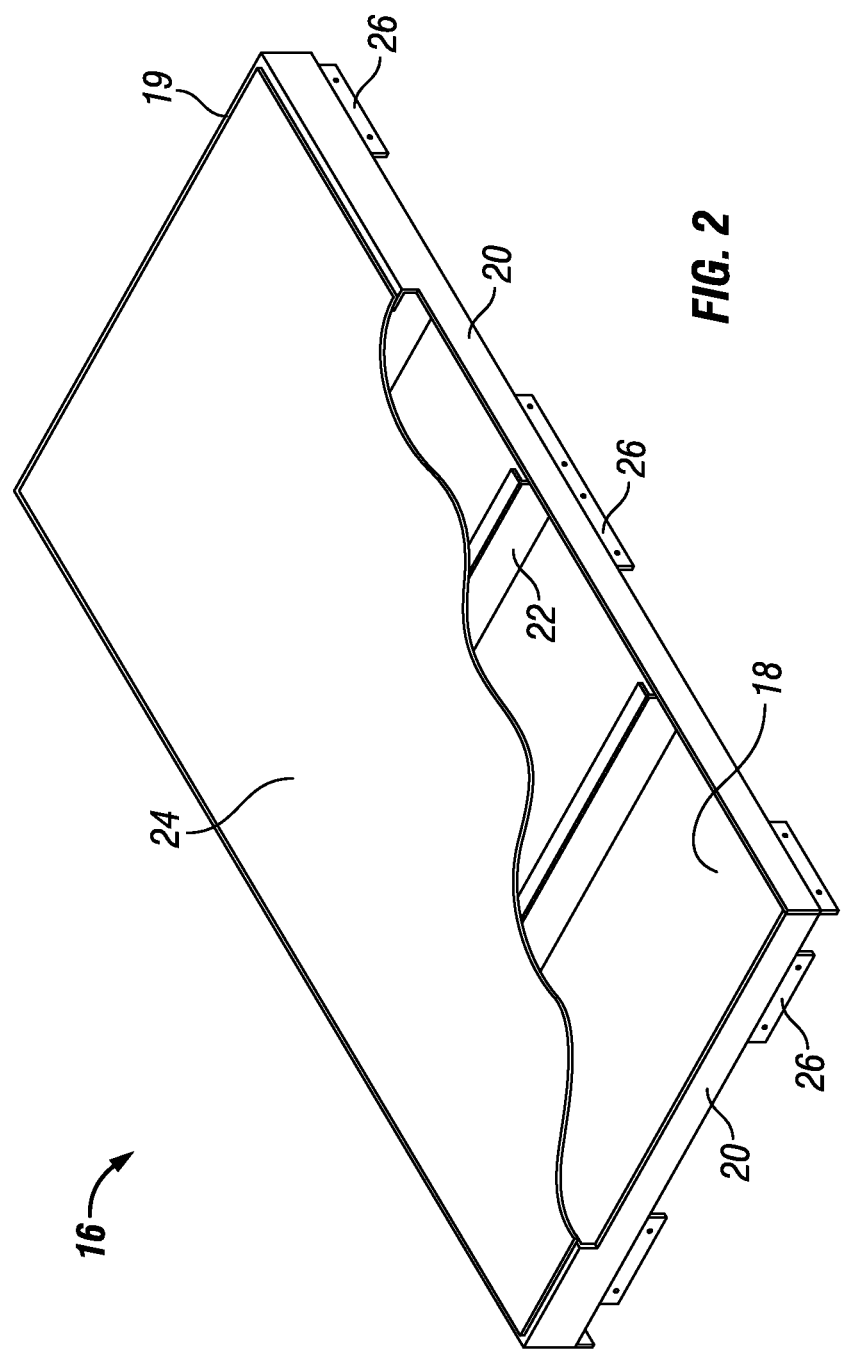
FIG. 2 illustrates a top perspective view of a pontoon.

Floating roof 14 may comprise a plurality of attached pontoons 16. Pontoons 16 may be comprised of any suitable material for floating on chemical fluid 10. Suitable material may be, but is not limited to, stainless steel, aluminum, steel, black iron, fiberglass, high-density polyethylene (HDPE), and/or any combination thereof. In embodiments, pontoons 16 may be four sided and may further comprise any suitable shape. A suitable shape may be, but is not limited to, square, rectangular, polyhedral, and/or any combination thereof. As illustrated in FIG. 2, pontoons 16 may comprise a lower panel 18, outer walls 20, stiffeners 22, upper panel 24, and panel clips 26. Lower panel 18 may comprise any suitable shape. A suitable shape may be, but is not limited to, square, rectangular, polyhedral, and/or any combination thereof. In embodiments, lower panel 18 may have a length and/or width of about two feet to about twenty feet, about five feet to about fifteen feet, about ten feet to about eighteen feet, or about six feet to about twelve feet. Lower panel 18 may comprise a single sheet of material and may form a structure in which outer walls 20, stiffeners 22, upper panel 24, and panel clips 26 may be disposed.

Figure 3:
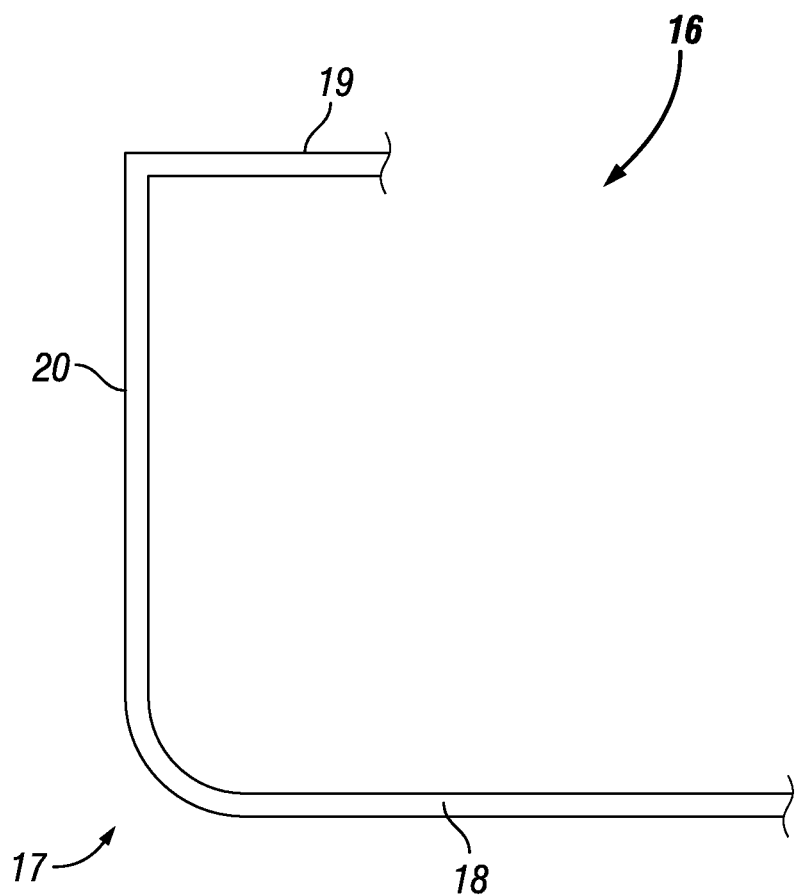
FIG. 3 illustrates a formed corner.

As illustrated in FIGS. 2 and 3, outer walls 20 may be disposed at the edges of lower panel 18. Outer walls 20 may comprise any suitable shape. A suitable shape may be, but is not limited to, square, rectangular, polyhedral, and/or any combination thereof. In embodiments, outer walls 20 may have a height of about two inches to about twelve inches, about four inches to about eight inches, or about six inches to about ten inches. Outer walls 20 may be welded to the edges of lower panel 18 and/or welded to adjacent outer walls 20, which may form an open box configuration. Additionally, as illustrated in FIG. 3, the edges of lower panel 18 may be folded, formed, pressed, drawn, and/or any combination thereof to form outer walls 20. In embodiments, formed edges 17 may be defined as any portion of lower panel 18, outer walls 20, or their union may be mechanically or otherwise plastically deformed in order to create a final fabricated shape. This may allow outer walls 20 and lower panel 18 to be comprised of the same sheet of material, which may form a seamless edge. A seamless edge may reduce the amount of welding that may be required to produce a pontoon 16 and may prevent leaking between lower panel 18 and outer walls 20.

Referring to FIG. 3, outer wall 20 may further be folded along the edges opposite lower panel 18, forming a ledge 19. In embodiments, ledge 19 may be about a quarter of an inch to about four inches long, about an inch to about three inches, or about two inches to about four inches. Ledge 19 may comprise any suitable shape. A suitable shape may be, but is not limited to, square, rectangular, polyhedral, and/or any combination thereof. Ledge 19 may provide strength to outer wall 20 and may serve as a connection area for upper panel 24. In embodiments, ledge 19 may form a ninety degree angle with outer wall 20 or any suitable angle upon which upper panel 24 may attach. Mechanically bending outer wall 20 to form ledge 19 may prevent deflection, warping, movement, bending, and/or deformation of outer wall 20 and in turn pontoon 16.

To provide additional structural support, as illustrated in FIG. 2, a stiffener 22, and/or a plurality of stiffeners 22, may run the length and/or width of pontoon 16. Stiffeners 22 may be disposed upon lower panel 18 and may further be disposed adjacent outer walls 20. Additionally, in certain embodiments, upper panel 24 may be disposed above stiffeners 22. In embodiments, stiffeners may be disposed from one another at any length. A suitable length may be about one inch to about twelve inches, about two inches to about ten inches, about four inches to about six inches, about six inches to about twelve inches, or about twelve inches to about twenty four inches. Stiffeners 22 may be formed, pressed, machined, and/or any combination thereof into a "C-Channel" and/or "U-Channel." As described above, the mechanical bend within stiffeners 22 may strengthen stiffeners 22 and in turn strengthen lower panel 18, which may prevent deflection, warping, deformation, and/or bending of pontoon 16. Stiffeners 22 may attach to lower panel 18, outer wall 20, and upper panel 24 by any suitable means. Suitable means may be, but are not limited to, weld, adhesive, nuts and bolts, screws, and/or any combination thereof. Upper panel 24 may further be disposed above stiffeners 22, which may prevent deflection, warping, and/or bending of upper panel 24. Upper panel 24 may attach to ledge 19 of outer walls 20. Upper panel 24 may attach to outer walls 20 by weld, adhesive, nuts and bolts, and/or any combination thereof. Attachment of upper panel 24 to ledge 19 may seal stiffeners 22 within pontoon 16.

Figure 4:
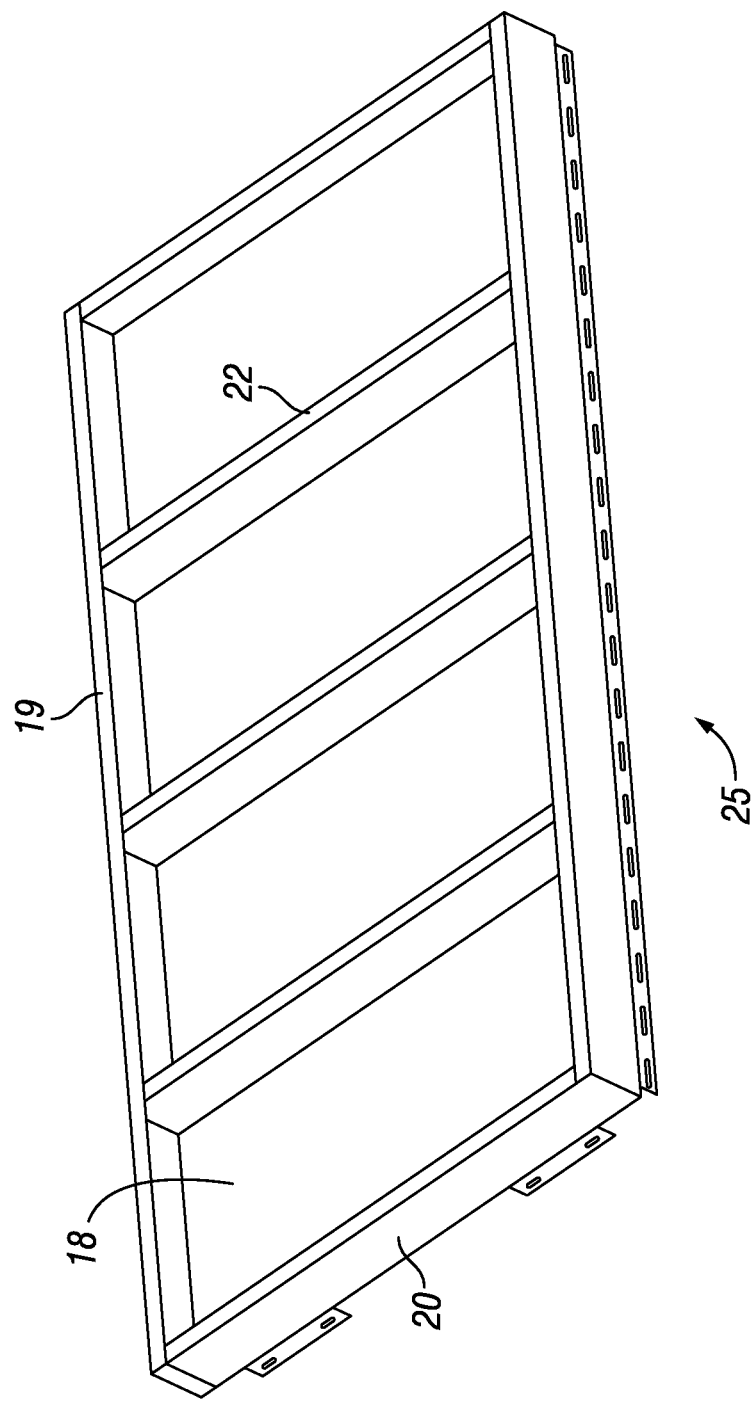
FIG. 4 illustrates a top perspective view of an open pontoon.

In embodiments, there may be two types of pontoons 16. Those two types may be an "open pontoon," which may not have an upper panel 24, and a "closed pontoon," which may have an upper panel 24. An open pontoon 25 is illustrated in FIG. 4. As illustrated, open pontoon 25 may comprise a lower panel 18, outer walls 20, ledge 19, and stiffeners 22. Open pontoons and closed pontoons may each have characteristics suitable for different projects. For example, open pontoons 25 may not trap vapor if an open pontoon 25 forms a leak. Additionally, open pontoons 25 may be cheaper to fabricate and may weigh less than a closed pontoon. Closed pontoons may form an additional barrier against evaporation within storage tank 4, may be easier to handle and install, may be difficult to sink, and may require lower design loads. In embodiments, a plurality of pontoons 16 may form floating roof 14. Attaching pontoons 16 together may form floating roof 14. The large surface area of floating roof 14 may allow for floating roof 14 to be buoyant enough to float on chemical fluids 10.

Figure 5:
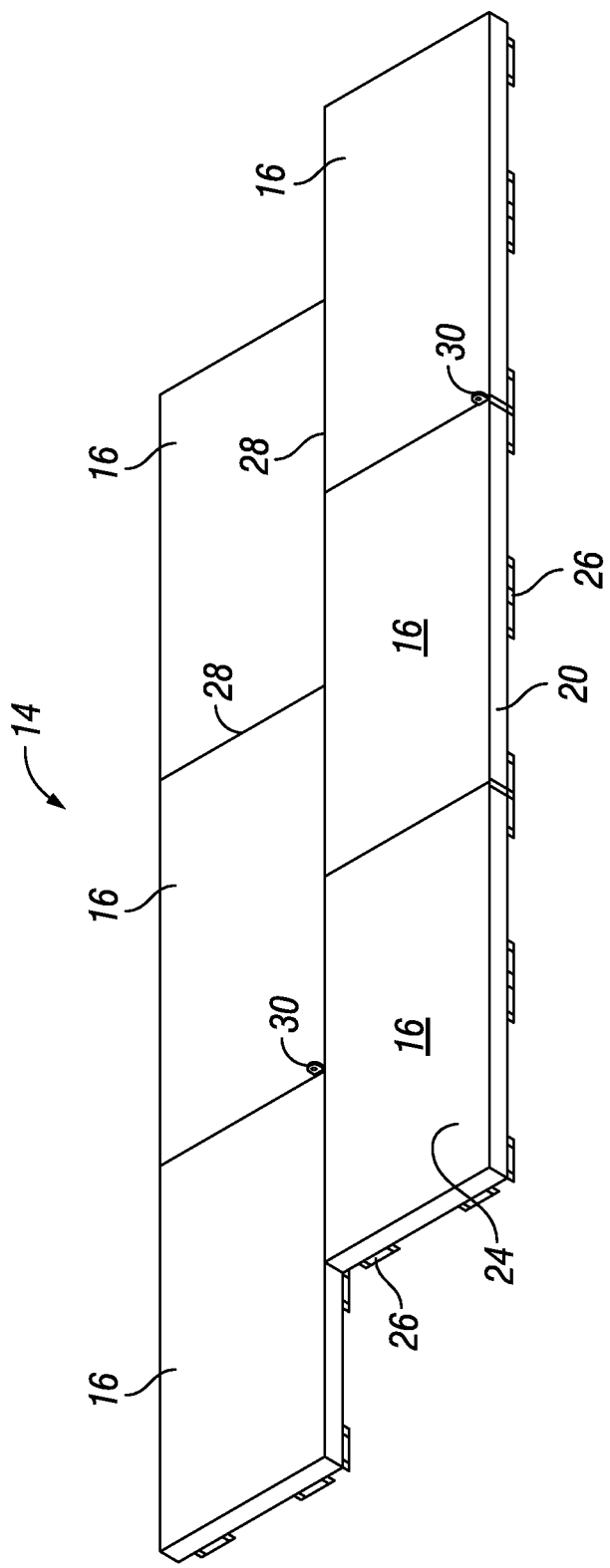
FIG. 5 illustrates a top perspective view of a plurality of attached pontoons.
Figure 6:
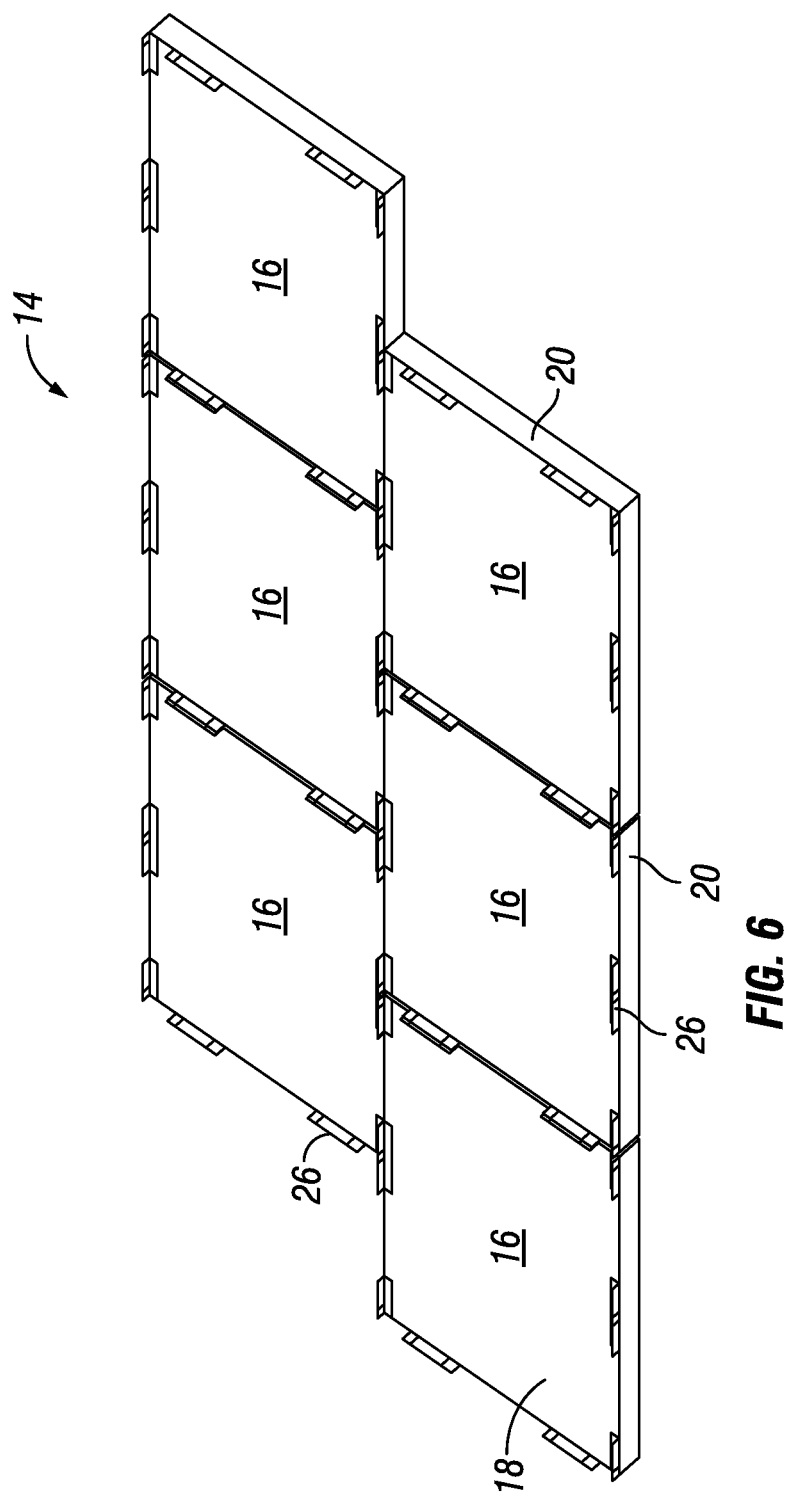
FIG. 6 illustrates a bottom perspective view of a plurality of attached pontoons.

Pontoons 16 may attach together through panel clips 26, as illustrated in FIGS. 5 and 6. A plurality of panel clips 26 may be disposed along the edges of lower panel 18 of pontoon 16 and may further be disposed in a direction opposite outside walls 20. In embodiments, panel clips 26 may comprise any suitable shape. A suitable shape may be, but is not limited to, square, rectangular, polyhedral, and/or any combination thereof. Panel clips 26 may have a length of about one inch to about twelve inches, about four inches to about eight inches, about six inches to about twelve inches, or about two inches to about six inches. In embodiments, there may be any suitable number of panel clips disposed on lower panel 18. A suitable number of panel clips 26 may be, but is not limited to, about one to about six, about two to about four, or about three to about six panel clips. In embodiments, panel clips 26 on a pontoon 16 may align with panel clips 26 on an adjacent pontoon 16. Nuts and bolts, welding, adhesive, and/or any combination thereof may be used to bind adjacent panel clips 26 together. Additionally, pontoons 16 may connect along the edge of outer wall 20 opposite the edge in which panel clips 26 may be disposed.

As illustrated in FIG. 5, connectors 28 may be used in conjunction with panel clips 26 to bind adjacent pontoons 16 into a floating roof 14. In embodiments, connectors 28 may connect the edge of outer wall 20 with ledge 19 to an adjacent pontoon 16 outer wall 20 with ledge 19. Connectors 28 may take the form of a weld, adhesive, nuts and bolts, and/or any combination thereof. In embodiments, connectors 28 may bind the top of pontoons 16 and panel clips 26 may bind the bottom of pontoons 16. Additionally, there may be a buffer, not illustrated, disposed between adjacent pontoons 16. The buffer may help prevent evaporation of chemical fluid 10 and may further prevent adjacent pontoons 16 from rubbing against each other, which may lead to excessive wear and tear. In embodiments, the buffer may be any suitable material to prevent wear and tear, suitable material may be rubber, plastic, neoprene, and/or any combination thereof. Forming floating roof 14, pontoons 16 may further comprise attachment points 30 to further support floating roof 14 in an absence of chemical fluids 10 to float on.

In embodiments, attachment points 30, as illustrated in FIGS. 5 and 6, may be disposed at any suitable location on pontoon 16. Specifically, attachment points 30 may be disposed along outer walls 20 and/or upper panel 24. In embodiments there may be a plurality of attachment points 30 on a single pontoon 16. In alternate embodiments, attachment points 30 may be located throughout selected pontoons 16 within floating roof 14. Attachment points 30 may be disposed along the edge at about the center, about the corner, and/or between the center and corner of outer walls 20. Additionally, attachment points 30 may be disposed about the center, about the edge, and/or between the edge and center of upper panel 24. In embodiments, attachment points 30 may attach to upper panel 24 and/or outer walls 20 by any suitable means. Suitable means may be nuts and bolts, adhesive, weld, and/or any combination thereof. As illustrated, attachment points 30 may be a hook, D-Ring, take off, extrusion, and/or any suitable support device. Attachment points 30 may be used by supports 12 to support floating roof 14 with storage tank roof 8, as described above, best illustrated in FIG. 1.

Figure 7:
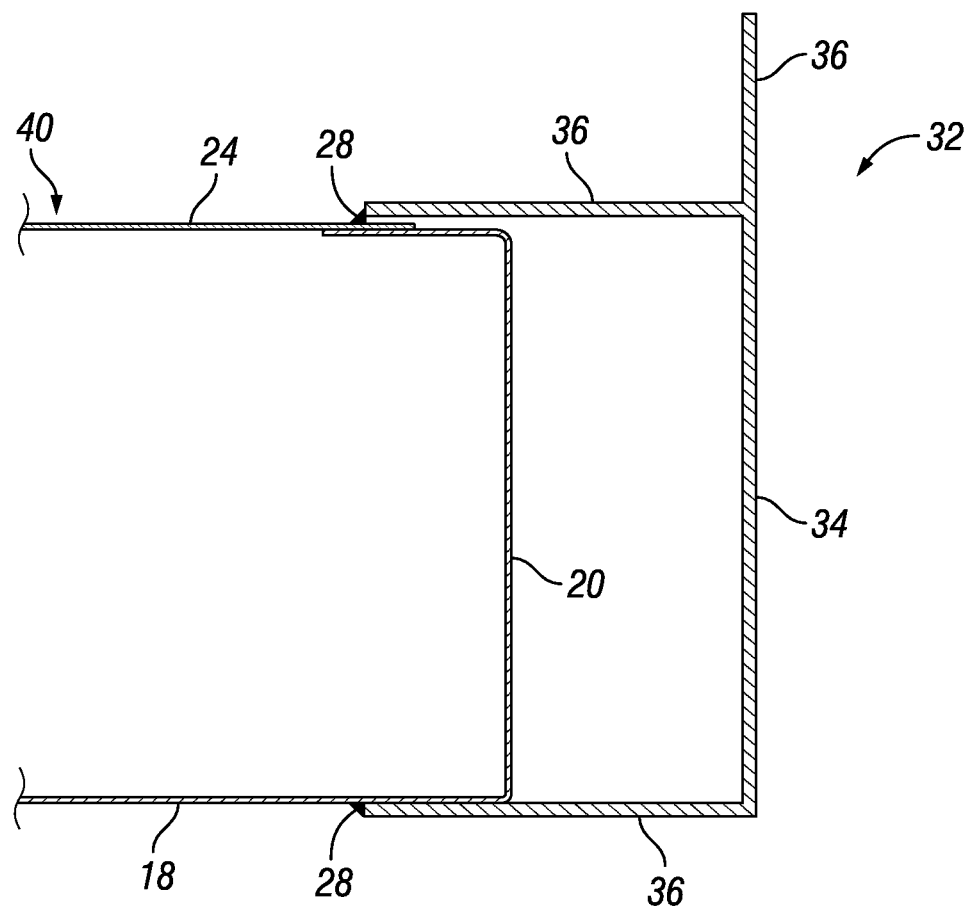
FIG. 7 illustrates a side perspective of a rim attached to an outermost pontoon.
Figure 8:
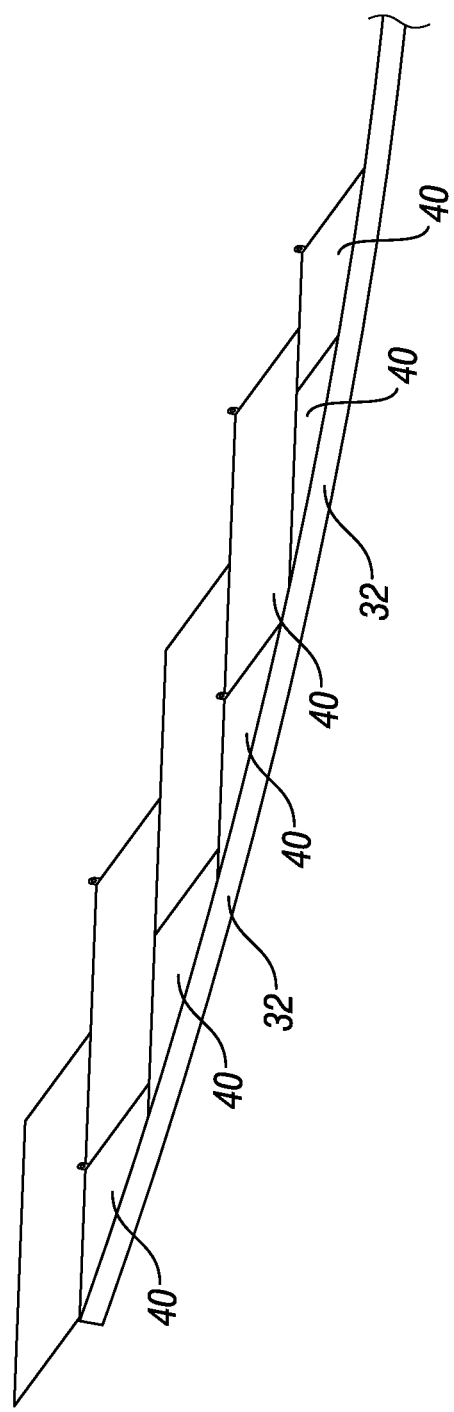
FIG. 8 illustrates a top perspective of a rim attached to an outermost pontoon.

As illustrated in FIG. 7, rim 32 may be attached to an outermost pontoon 40 and may separate floating roof 14 from storage tank wall 6 (e.g., shown in FIG. 1). Rim 32 may comprise any suitable material. Suitable material may be, but is not limited to, stainless steel, aluminum, steel, black iron, and/or any combination thereof. In embodiments, rim 32 may comprise a channel 34. Channel 34 may be a "C-channel" and/or "U-channel" and may further comprise a flange 36 opposite the end of rim 32 that may be adjacent to chemical fluid 10. Flange 36 may prevent chemical fluid 10 from splashing over and onto pontoons 16 and outermost pontoons 40. Additionally, rim 32 may comprise rim extensions 38. Rim extensions 38 may connect rim 32 to outermost pontoons 40. Specifically, rim extensions 38 may attach to the upper and lower edges of outer wall 20. In alternative embodiments, rim extensions 38 may attach to lower panel 18 and upper panel 24. Rim extensions 38 may connect to outer wall 20, lower panel 18, and/or upper panel 24 by any suitable connector 28. A suitable connector 28 may be a weld, adhesive, nuts and bolts, and/or any combination thereof. In embodiments, not illustrated, rim 32 may be separated from storage tank wall 6 by a spacer, not illustrated. The spacer may prevent rim 32 and storage tank wall 6 from contacting, which may prevent excessive wear and tear on rim 32 and storage tank wall 6. In embodiments, as illustrated in FIG. 8, rim 32 may run the length of outermost pontoons 40. This may allow outermost pontoons 40, which may each have a rim 32, to form a single segmented rim. Individual rims 32 forming a single segmented rim may require less welding and/or connectors 28 disposed on outermost pontoons 40. Rims 32 may connect to adjacent rims 32 by a weld, adhesive, and/or any combination thereof.

Currently, the construction of floating roof system 2 may be performed at the site of storage tank 4. Pontoons 16, which may comprise floating roof 14, may require large amounts of welding and may be labor intensive. Pontoons 16 may be welded together and a single rim may be welded along the outer edge of the outermost pontoons 40 to form floating roof 14. Current methods of producing a floating roof 14 may be slow, expensive, and prone to quality control issues. A major contributing factor to expense and production time may be welding time and the number of welds made. A method of producing a floating roof 14 that reduces the amount of welding time and welds may result in reducing the amount of welding immersed in chemical fluid 10, which may prevent pontoons 16 from leaking.

A method to reduce welding may include manufacturing pontoons 16 within a fabrication facility. As noted above, lower panel 18 and outer walls 20 may be made of the same sheet of material using formed edges and/or other techniques that may produce seamless edges, which may need to be welded. In alternative embodiments, a single sheet of material may be cut and folded to produce seams between adjacent outer walls 20, which may require only the smallest of welding time and welds. Each embodiment may reduce the amount of welding needed to produce pontoon 16. The small amount of welding may also increase the quality of pontoons 16 produced, as the seams that may be welded may be of a smaller length. In embodiments, upper panel 24 and attachment points 30 may be attached to pontoons 16, which may occur within the fabrication facility. Producing pontoons 16 within a manufacturing facility may allow for larger amounts of pontoons 16 to be produced in a shorter amount of time. A shipment of pontoons 16 may then be sent to storage tank 4 for final assembly and installation.

Pontoons 16 may be assembled using nuts and bolts and panel clips 26. In embodiments a buffer may be placed between pontoons 16 before attaching pontoons 16. Nuts and bolts may hold pontoons 16 together, which may facilitate welding pontoons 16 to each other. This process may be repeated any number of times to produce a floating roof 14. Outermost pontoons 40, may be made in the field due to their radial geometry (in alternative embodiments outermost pontoons may be made in a fabrication facility), which may allow the outermost pontoons 40 to be disposed adjacent storage tank wall 6. Currently, the outermost pontoons 40 may be welded to a single and/or a small number of rims 32, which may overlap adjacent outermost pontoons 40. This may cause welding problems due to the geometry and length of the welds. As illustrated in FIG. 8, to lessen the amount of welding required, each outermost pontoon 40 may have a separate rim 32 attached to outermost pontoons 40. Adjacent rims 32 may be welded together with shorter welding lengths. Shorter welds may increase quality and reduce the amount of welding time. This method of producing a floating roof 14 may be more efficient than previous methods and reduce cost and production time.

The foregoing figures and discussion are not intended to include all features of the present techniques to accommodate a buyer or seller, or to describe the system, nor is such figures and discussion limiting but exemplary and in the spirit of the present techniques.

What is claimed is:

1. A method of fabricating a pontoon for a storage tank, comprising:
    deforming a sheet of material to form an open box shape having a lower panel and a plurality of outer walls with formed edges between the lower panel and each of the plurality of outer walls, wherein the formed edges are seamless to prevent fluid from passing between the lower panel and each of the plurality of outer walls, and wherein the plurality of outer walls comprise at least three outer walls;
    bending the outer wall to form a ledge, wherein the ledge overhangs the lower panel; and
    attaching an upper panel to the ledge.

2. The method of claim 1, further comprising disposing a plurality of stiffeners between the lower panel and the upper panel.

3. The method of claim 1, further comprising disposing at least one attachment point to the outer wall.

* * * * *